April 24, 1934.　　　　F. S. SMITH　　　　1,955,776
ELECTRIC CONDENSER
Filed Feb. 23, 1929　　　2 Sheets-Sheet 2
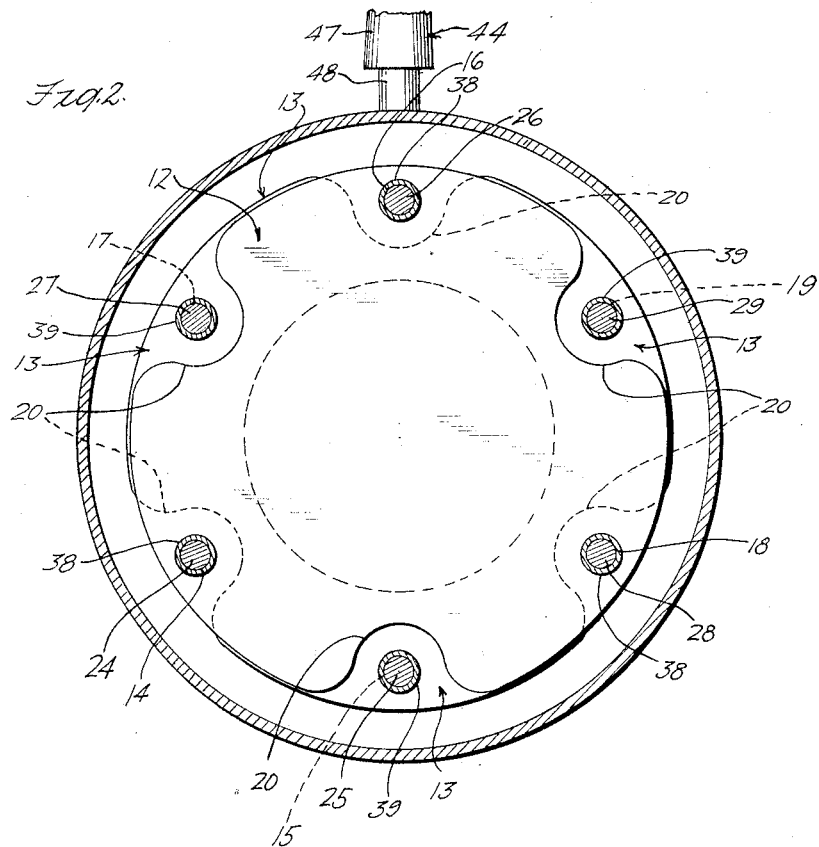
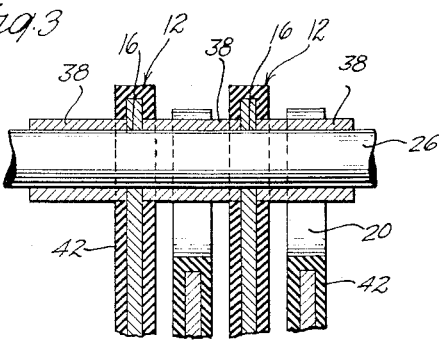
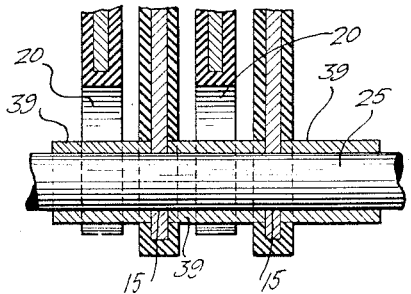
Franklin S. Smith
INVENTOR
BY Robert S. Blair
ATTORNEY Patented Apr. 24, 1934

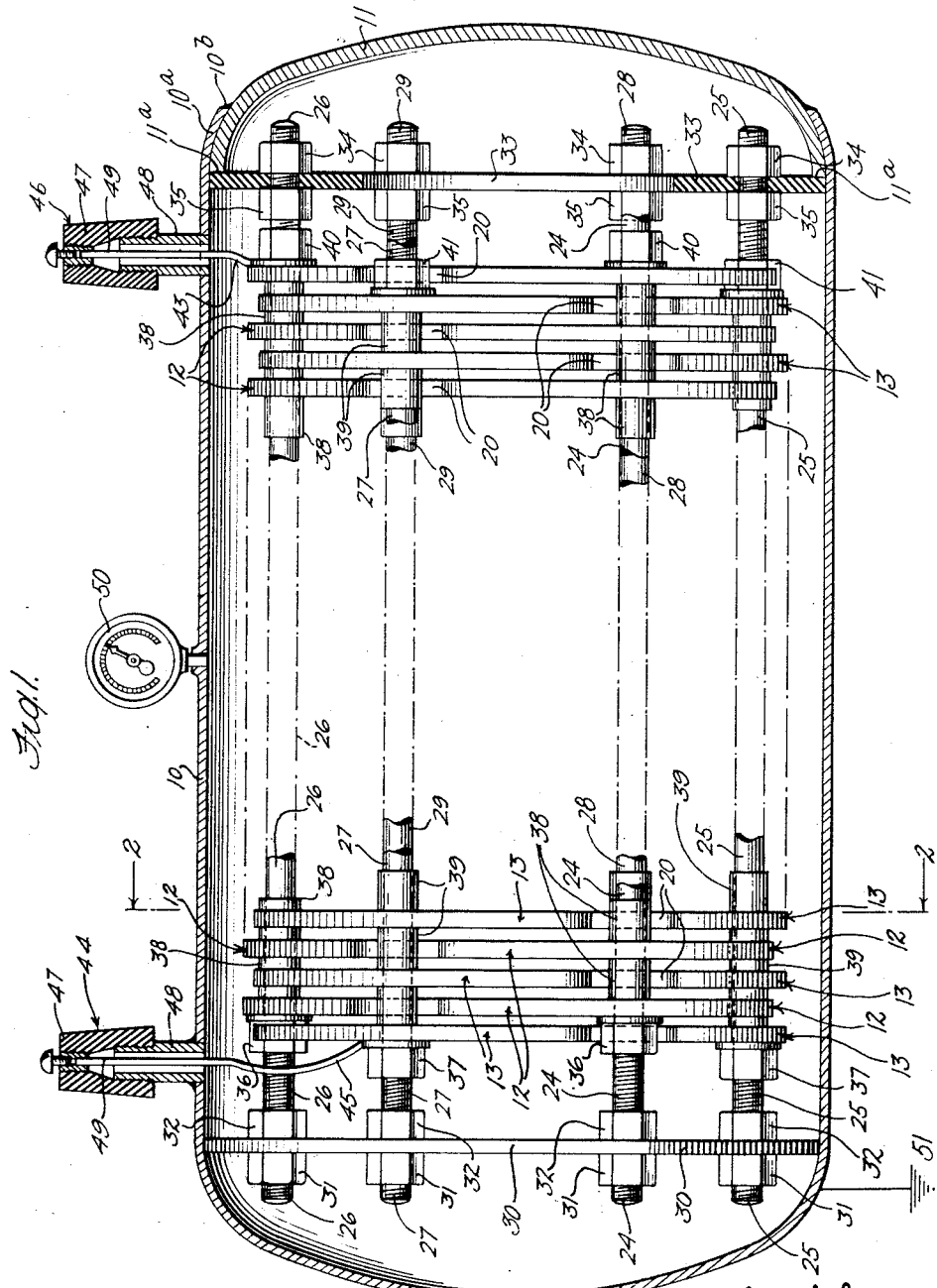

1,955,776

UNITED STATES PATENT OFFICE 1,955,776

ELECTRIC CONDENSER

Franklin S. Smith, Brooklyn, N. Y.

Application February 23, 1929, Serial No. 341,897

10 Claims. (Cl. 175—41)

This invention relates to electric condensers and more specifically to electric condensers adapted to function at relatively high voltages.

One of the objects of this invention is to provide a simple and thoroughly practical condenser construction capable of rapid and inexpensive manufacture. Another object is to provide a condenser construction of great durability electrically and of high efficiency of action in use. Another object is to provide an electric condenser well adapted to operate under high voltages without danger of failure of insulation and free from fire hazard. Another object is to provide a high voltage condenser of high capacity per unit volume. Another object is to provide an electric condenser that will be of compact and light construction, capable of operating at high voltages, and well adapted to meet the hard conditions of practical use. Other objects will be in part obvious or in part pointed out hereinafter.

The invention accordingly consists in the features of construction, combinations of elements, and arrangements of parts as will be exemplified in the structure to be hereinafter described and the scope of the application of which will be indicated in the following claims.

In the accompanying drawings, in which is shown one of various possible embodiments of my invention, Figure 1 is a vertical central section through an assembled condenser construction;

Figure 2 is a vertical sectional view, as seen along the line 2—2 of Figure 1, and Figure 3 is a view on an enlarged scale showing certain features of the assembly and insulation of the plate electrodes, certain parts being shown in section and certain parts being broken away in order to show certain features of construction more clearly.

Similar reference characters refer to similar parts throughout the several views in the drawings.

Turning now to the drawings and referring particularly to Figures 1 and 2, there is shown a tank 10 of generally cylindrical shape closed by a head 11 welded to the side walls of the tank 10. The container 10, excepting for the separate head 11 thereof, is preferably of integral construction and conveniently is formed of pressed steel, being thus well adapted to withstand relatively high pressures.

Within the container 10 are two sets of plates generally indicated at 12 and 13, the plates 12 alternating with the plates 13 and being suitably spaced therefrom. The plates 12 and 13 are preferably substantially disk-shaped, being of a lesser diameter than the inside diameter of the cylindrical container 10 so that the peripheral portions of the plates are suitably spaced from the container 10 itself.

The plates 12 are suitably apertured, each preferably in three places spaced substantially 120° about the outer peripheral portions of the plate, as at 14, 16 and 18, while the plates 13 are similarly apertured in preferably three equally spaced places, as at 15, 17 and 19 (see Figure 2). At substantially the midpoint along the periphery of the plates between the equally spaced apertures therein, each plate is cut away as is generally indicated at 20 (see Figure 2), each plate thus having three cut away portions 20 spaced 120° about the periphery of the plate.

The plates 12 and 13 may be made of any suitable sheet metal and are of suitable thickness and conveniently arc shaped, as will be clear in view of the foregoing, to permit of their being readily stamped or punched from sheet metal stock.

The plates 12 and 13 which, as above noted, alternate with each other and are spaced from each other, are strung respectively on rods 24, 26 and 28 (for the plates 12) and rods 25, 27 and 29 (for the plates 13), all of the rods being threaded at their respective ends to have threaded thereon suitable nuts. The threaded ends of all six rods extend through suitable openings in an annular or ring-like member 30 (see Figure 2) made of solid dielectric material, such as bakelite, for example, and of sufficient outside diameter to be slidably received into the tank 10, from the open or right-hand end thereof, and thus to be held against the left-hand end of the tank 10 where the latter begins to curve to form the end wall thereof. Nuts 31 and 32, one on each side of the dielectric supporting ring 30, are threaded onto each of the rods, tightened up, and thus the rods are rigidly secured to the support 30, being spaced thereabout by substantially 60° (see Figure 2). The several rods, in the illustrative embodiments shown as six in number, are thus held alined and after the assembled plates are as a unit inserted into the tank 10, will also be held alined substantially with the axis of the tank 10 itself, the remote or right-hand ends of all of the rods being in a similar manner supported and alined by and secured to a similar ring-shaped support 33 of solid dielectric material, as by nuts 34 and 35.

The endmost or left-hand end plate 12, as seen in Figure 1, abuts against three nuts 36, one threaded on each of the rods 24, 26 and 28, the nuts being adjusted so that their right-hand faces, against which the plate 12 rests, lie in a plane substantially transverse of the axis of the container 10. The left-hand end plate 13, as seen in Figure 1, rests against three nuts 37, threaded one on each of the rods 25, 27 and 29, the nuts 37 being adjustably positioned so that their right-hand faces, against which the endmost plate 13 rests, lie in a transverse plane spaced, however, to the right of the endmost plate 12 by a distance which it is desired to have between these two plates. The cut away portions 20 in a plate 12 accommodate the supporting rods 25, 27 and 29 and the cut away portions 20 in a plate 13 accommodate the supporting rods 24, 26 and 28.

The remaining plates 12 are spaced from each other by metallic sleeves 38 (see Figure 3) strung on the rods 24, 26 and 28, while the plates 13 are held in spaced relation with respect to each other and with respect to the opposed plates 12 by means of similar sleeves or tube-like members or spacers 39 strung on the supporting rods 25, 27 and 29. Thus, plates 12 and 13 alternate with respect to each other, while the plates, such as plates 12 and the spacers, such as spacers 38, of one set of the plates, are alternated, as will be clear from Figures 1 and 3 of the drawings.

Thus, the two sets of plates may be built up or stacked and nuts 40 threaded on the rods 24, 26 and 28 act to clamp the plates 12 and their spacers 38 in rigid position. Nuts 41 threaded on the right-hand end portions of the rods 25, 27 and 29 clamp the plates 13 and their interposed spacers 39 securely in place.

The plates 12 and 13 are covered on both sides thereof by means of a solid dielectric material generally indicated in the drawings at 42 (see Figure 3); this material may be made of any suitable solid dielectric and by way of example may comprise rubber cataphoretically deposited on the metal plates 12 and 13. The solid dielectric material 42 is given a suitable thickness, as will be made clear hereinafter.

The assembled plate structure, constructed as above described, may then be inserted into the container 10, the solid dielectric supports 30 and 33 snugly fitting within the circular walls of the container 10. The head 11 is then inserted into the open end of the container 10 so that its edge portion 11ª (Figure 1) rests against the outer periphery of the solid dielectric support 33. The peripheral or rim portion 10ª of the container 10 is then hammered over the curved portion of the head 11 and welded thereto as at 10ᵇ, the resultant joint being not only mechanically strong but also air-tight. The arrangement, furthermore, will be seen to dependably position and hold the plate structure inside the container 10.

A conductor 43 is connected to the plates 12 forming one set of the opposed plate electrodes of the condenser and is carried out through the side of the tank 10 through a high voltage terminal construction generally indicated at 44, while a conductor or lead 45 is connected to the other set of plates 13 and is carried through the side wall of the tank 10 by means of a high voltage terminal construction generally indicated at 46. Conveniently these terminal connections may be made by utilizing one or more of the threaded nuts on the supporting rods of the respective sets of plates for clamping the conductors 43 and 45 thereto.

The terminal construction 44 and 46 is constructed also to withstand relatively high pressures and is air-tight. Each terminal construction may comprise a solid dielectric housing 47 connected to a bushing 48 which is suitably secured in an opening in the side wall of the container 10; the upper end of the housing 47 of solid dielectric supports a rigid conductor 49 which extends through the bushing 48, concentric therewith and spaced therefrom, and to its lower end is connected the lead wire or conductor 43.

The tank 10 is filled with a suitable gaseous dielectric under pressure and preferably the pressure is of the order of 15 atmospheres. Illustratively, the gas may comprise nitrogen. The gaseous dielectric under pressure also fills the space between the rigid conductor 49 and the bushing and the space between the conductor 49 and the housing 47 of solid dielectric material.

The radii of the bushing 48 and of the conductor 49 are so selected that together they form a "fast discharge gap", that is, a gap which will break down at a predetermined voltage, preferably a voltage below that at which any part of the solid dielectric material of the condenser construction will be injured or punctured, but without being preceded by corona. Surges, transients, or the like, of high voltage are thus prevented from being impressed upon the condenser construction for the fast gap instantaneously breaks down, but is self-restoring the instant that the transient, surge, or the like, ceases.

Considering now more particularly certain features of this invention, it is first to be pointed out that the gaseous dielectric under pressure fills the spaces between the opposed plates 12 and 13 but, referring to Figures 1 and 3, it will be seen that, because of the solid dielectric covering 42 on the metal plates of the condenser, any two adjacent plates are insulated from each other not by gaseous dielectric under pressure alone nor by solid dielectric alone, but rather by both solid dielectric and gaseous dielectric under pressure in series. By this arrangement I achieve many great advantages.

For example, I am enabled to provide a condenser construction having a high electrical capacitance per unit volume and, moreover, one exceedingly well adapted to operate at very high voltages. The capacitance of a condenser is a direct function of the specific inductive capacity or permittivity of the medium between the plates. The dielectric strength of a gaseous dielectric under pressure is very great but its specific inductive capacity on the other hand is very low. An excellent high voltage condenser may thus be achieved, but its capacity per unit volume will be relatively small. On the other hand, if the medium between the opposed plates were all solid dielectric of high specific inductive capacity, the thickness of the solid dielectric to withstand the high voltages would have to be much greater than the thickness of a gaseous dielectric under pressure (for the same voltage, of course), and thus the capacity may be increased but also the volume of the condenser is increased; moreover, the losses in the solid dielectric would be very high, due to its great mass, and thus low efficiency would result, as well as difficulties or problems as to the withdrawal of the heat generated in the solid dielectric due to electric absorption, dielectric hysteresis, and the like.

According to my invention, however, I avoid the disadvantages above pointed out, and I am enabled to achieve a condenser of high capacity, high efficiency, and exceedingly well adapted to withstand average voltage gradients. By making the medium between opposed plates of both solid dielectric and gaseous dielectric in series, I am enabled to greatly diminish the quantity of solid dielectric necessary to withstand the high voltage that would otherwise be necessary if used alone to withstand the high voltage gradients, thus vastly diminishing the absorption, hysteresis, and similar losses; at the same time, I achieve a closer spacing between the electrodes but maintain a dielectric medium therebetween whose average specific inductive capacity is far greater than that of the gaseous dielectric under pressure alone, so that the capacitance of the condenser is relatively high.

The dielectric stress between any two plates 12 and 13, equivalent to the voltage impressed across the opposed sets of plates, is distributed between the solid dielectric 42 and the gaseous dielectric under pressure in series therewith inversely as the respective permittivities of these two dielectrics. For example, the permittivity of the solid dielectric material may be as high as 5 or 6, while the permittivity of the gaseous dielectric under pressure is relatively low, being practically unity. The potential stress between the two plates is distributed between these two different dielectrics substantially inversely as their permittivities, the gaseous dielectric assuming five or six times as much of the total stress as does the solid dielectric, where the gaseous dielectric under pressure has a permittivity of substantially unity. Thus, the spacing between opposed plates may be made very much less, for a given voltage, than would be the case if solid dielectric alone were depended upon for maintaining the insulation.

Referring to the figures in the drawings, it will be seen also that the peripheries of the plates 12 and 13 are covered with the solid dielectric material 42 and, as is clearly seen from Figure 1, the peripheries of the plates 12 and 13 are insulated from the walls of the tank 10 by a similar series relation between the solid dielectric under pressure. Thus, also, I am enabled to greatly diminish the peripheral spacing between the plates 12 and 13 and the inside wall of the container 10, and thus I am able materially to increase the area of the plates than would be otherwise possible, it being noted that, where the plates are substantially circular, as in the preferred embodiment of my invention, the area increases with the square of the diameter.

The gaseous dielectric under pressure also coacts in a unique way with the solid dielectric supports 30 and 33 in preventing leakage currents along the solid dielectric from the supporting rods 25, 27 and 29 to the supporting rods 24, 26 and 28, or vice versa, these two sets of rods being, of course, maintained at the same difference of potential that the two sets of plates are. This coaction will be better understood when it is noted that, where the pressure employed is about 16 atmospheres, the voltage necessary to cause leakage along a given length of solid dielectric material, such as along the bakelite members 30 and 33, is on the order of five times as great as the voltage necessary to cause leakage along these members without the coaction of the gaseous dielectric under pressure. Thus, leakage is effectively prevented, the supporting rods may be more closely spaced for a given voltage than would otherwise be necessary, and thus great mechanical rigidity and durability may be achieved.

Recurring to the spacing and insulation of the opposed plates 12 and 13, it may be pointed out that the dielectric stress is greatest between these opposed plates adjacent the opposed peripheries thereof, and it is at such opposed peripheries that break-down tends to occur. In past practice it has been necessary to space condenser elements by a distance dependent upon this greatest or concentrated peripheral dielectric stress, and to include a suitable factor of safety, and where reliance has been placed on solid dielectric alone, the latter had to be made of such great thickness, with such disadvantages as have above been pointed out, as would safely withstand this increased or concentrated dielectric stress. By serially relating a solid dielectric and a gaseous dielectric under pressure, as I have done by means of my invention, at these peripheral points, I am again enabled vastly to diminish the required spacing and, moreover, to greatly relieve the solid dielectric material used at these peripheral points of the otherwise great stress imposed upon it, due to the assumption by the gaseous dielectric under pressure of by far the major or greater portion of the total dielectric stress between these peripheral portions of the plates. I am thus enabled to greatly diminish the chances of break-down at these peripheral or edge portions of the plates and to accomplish this result with a minimum utilization of solid dielectric material.

The fast discharge gaps associated with the high tension terminals 44 and 46 are preferably so proportioned that they break down, as above noted, without being preceded by corona, at a voltage which is less than that which will injure any of the solid dielectric, such as the parts 42, embodied in the condenser construction, and thus I am further enabled to achieve greater capacitance per unit volume and high efficiency of operation by making it unnecessary to cause the dielectric medium between the condenser plates itself to withstand the abnormal transient, surge, or other voltages.

As above pointed out, the material of which the solid dielectric 42 is made may be of any suitable or appropriate character; it may, for example, be made of fiber, hard rubber, bakelite, etc. However, I prefer to deposit rubber cataphoretically upon the plates and thereby achieve a number of important and distinctive advantages; for example, the plates may thus be covered with solid dielectric material that is continuous, and more particularly I am enabled to closely envelop the peripheral edge and peripheral side portions of the plates, it being noted that it is at the peripheral edge portions that the dielectric stress is greatest. Thus, I can assure that a dielectric of high permittivity occupies that portion of the field that is of highest voltage gradient.

Furthermore, in preferably cataphoretically depositing solid dielectric on the condenser plates, I achieve uniformity of the thickness of the solid dielectric throughout the expanse of the plate, and I am able, moreover, to control with great nicety the thickness of the deposited solid dielectric simply by control of the process of deposition. Hence, I am not confined to standard thicknesses, nor hampered by nonuniformity of thicknesses of the solid dielectric material in such form as the latter is usually available on the market.

I do not wish to be confined necessarily to the use of condenser plates made of sheet metal of such thickness as to be per se mechanically rigid, and I distinctly contemplate as being within the scope of certain features of my invention, condenser plates made of metal foil. I am, in particular, enabled to achieve many practical advantages and new results where I coat the metal foil with cataphoretically deposited solid dielectric material such as rubber.

A pressure gage 50 is preferably associated with the tank 10 to indicate the pressure of the gaseous dielectric medium within the container and the tank 10 itself may and preferably is grounded as at 51.

It will thus be seen that there has been provided in this invention a condenser construction in which the several objects and advantages hereinabove pointed out, together with many others, are successfully achieved.

As many possible embodiments may be made of the above invention and as many changes might be made in the embodiment above set forth, it is to be understood that all matter hereinbefore set forth or shown in the accompanying drawings is to be interpreted as illustrative and not in a limiting sense.

I claim:

1. In electric condenser construction, in combination, a hermetically sealed container having therein a gaseous dielectric under pressure, spaced plates supported therein and adapted to form an electrical capacity, means for insulating said plates from each other comprising a layer of solid dielectric material and a layer of said gaseous dielectric under pressure, and protective means forming a fast discharge gap, the gap being filled with said gaseous dielectric under pressure, adapted to break down, without being preceded by corona, at a voltage less than that which would injure the solid dielectric insulation.

2. In electric condenser construction, in combination, a metallic casing, a pair of juxtaposed plate members, means for holding said plate members in spaced relation with respect to each other and from the walls of said casing, means for insulating the peripheral edge portions of said plate members from the adjacent wall portions of said casing, said last-mentioned means including solid dielectric material and a gaseous dielectric under pressure arranged in series, whereby the spacing between the edge portions of said plate members and the walls of said casing is diminished.

3. In electric condenser construction, in combination, a pair of juxtaposed plate members adapted to form an electric capacity, and means for insulating the peripheral edge portions thereof comprising solid dielectric material enveloping the peripheral side and edge portions, said solid dielectric material being continuous, and means forming a fast discharge gap adapted to break down, without being preceded by corona, at a voltage less than that which would injure said solid dielectric material.

4. In electric condenser construction, in combination, a casing, a pair of juxtaposed plate members therein adapted to form an electric capacity, and means for insulating the peripheral edge portions of said plate members from each other and from the adjacent wall portions of said casing, said insulating means comprising a gaseous dielectric under pressure and solid dielectric material enveloping the peripheral side and edge portions, said gaseous dielectric under pressure and said solid dielectric material being in series, and means for protecting said solid dielectric material against breakdown comprising a protective fast discharge gap filled with gaseous dielectric under pressure and adapted to break down, without being preceded by corona, at a voltage less than that which will injure the solid dielectric material.

5. In electric condenser construction, in combination, a pair of opposed plate electrode members of substantial opposed areas and adapted to form an electric capacity, one of said plate electrode members having a continuous covering thereover of solid dielectric material, and means forming a fast discharge gap adapted to break down, without being preceded by corona, at a voltage less than that which would injure said solid dielectric material.

6. In electric condenser construction, in combination, opposed plate electrode members adapted to form an electric capacity, means for insulating adjacent plates from each other comprising solid dielectric material and a gaseous dielectric under pressure in series therewith, and a protective fast discharge gap adapted to break down, without being preceded by corona, at a voltage less than that which will injure the solid dielectric material.

7. In electric condenser construction, in combination, a pair of juxtaposed plate members adapted to form a capacity, means including solid dielectric material for insulating said plate members from each other, and means forming a fast discharge gap having therein a gaseous dielectric under pressure and adapted to break down, without being preceded by corona, at a voltage less than that which would injure said solid dielectric material and greater than the intended voltage difference between said plate members.

8. In electric condenser construction, in combination, a casing having an open end, a plurality of plates forming an electrical capacity, means supporting said plates, said supporting means including two members, one of which bottoms in said casing and the other of which is substantially snugly fitted against the inside walls adjacent the open end of said casing, and a closure secured in the open end of said casing and having means engaging said other member to hold the latter and said supporting means against movement in a direction toward said closure.

9. In electric condenser construction, in combination, a casing having an open end, a plurality of plates forming an electrical capacity, means supporting said plates, said supporting means including two members, one of which bottoms in said casing and the other of which is substantially snugly fitted against the inside walls adjacent the open end of said casing, a closure for said casing, said closure fitting within the open end of said container and engaging said other member to prevent the latter and said supporting means from movement in a direction away from the bottom of said casing, and means securing said closure in position.

10. In electric condenser construction, in combination, a casing having an open end, a plurality of plates forming an electrical capacity, means supporting said plates, said supporting means including two members, one of which bottoms in said casing and the other of which is substantially snugly fitted against the inside walls adjacent the open end of said casing, a closure for said casing, said closure fitting within the open end of said container and engaging said other member to prevent the latter and said supporting means from movement in a direction away from the bottom of said casing, the portions of the walls of said container within which said closure is received being bent over the closure to hold it and said supporting means in place.

FRANKLIN S. SMITH.